United States Patent
Heimann et al.

(10) Patent No.: US 9,453,175 B2
(45) Date of Patent: Sep. 27, 2016

(54) BIOMASS FIRE-LOG AND METHOD OF MANUFACTURE

(71) Applicant: Enginuity Worldwide, LLC, Mexico, MO (US)

(72) Inventors: Robert L Heimann, Mexico, MO (US); Chad Sayre, Mexico, MO (US); T. J. Berry, Kearney, MO (US)

(73) Assignee: ENGINUITY WORLDWIDE, LLC, Mexico, MO (US)

( * ) Notice: Subject to any disclaimer, the term of this patent is extended or adjusted under 35 U.S.C. 154(b) by 0 days.

(21) Appl. No.: 14/600,161

(22) Filed: Jan. 20, 2015

(65) Prior Publication Data

US 2015/0203775 A1 Jul. 23, 2015

Related U.S. Application Data

(60) Provisional application No. 61/928,923, filed on Jan. 17, 2014.

(51) Int. Cl.

| | |
|---|---|
| *C10L 5/36* | (2006.01) |
| *C10L 5/04* | (2006.01) |
| *C10L 5/40* | (2006.01) |
| *C10L 5/44* | (2006.01) |
| *C10L 9/10* | (2006.01) |

(52) U.S. Cl.
CPC ............ *C10L 5/365* (2013.01); *C10L 5/04* (2013.01); *C10L 5/403* (2013.01); *C10L 5/442* (2013.01); *C10L 5/445* (2013.01); *C10L 5/447* (2013.01); *C10L 9/10* (2013.01); *C10L 2200/0469* (2013.01); *C10L 2230/06* (2013.01); *C10L 2230/12* (2013.01); *C10L 2230/18* (2013.01); *Y02E 50/10* (2013.01); *Y02E 50/30* (2013.01)

(58) Field of Classification Search
CPC .......... C10L 5/365; C10L 5/04; C10L 5/403; C10L 5/442; C10L 5/445; C10L 5/447; C10L 9/10; C10L 2200/0469; C10L 2230/06; C10L 2230/12; C10L 2230/18; Y02E 50/10; Y02E 50/30

See application file for complete search history.

(56) References Cited

U.S. PATENT DOCUMENTS

| 4,326,854 A | 4/1982 | Tanner | |
|---|---|---|---|
| 2011/0119996 A1* | 5/2011 | Heimann | .................. C10L 5/40 44/530 |
| 2013/0212935 A1 | 8/2013 | Heimann | |

FOREIGN PATENT DOCUMENTS

| CN | 103421569 | 12/2013 |
|---|---|---|
| EP | 1063278 | 12/2000 |
| KR | 100852790 | 8/2008 |

OTHER PUBLICATIONS

International Search Report for PCT/US2015/011968 mailed Mar. 30, 2015.

* cited by examiner

*Primary Examiner* — Cephia D Toomer
(74) *Attorney, Agent, or Firm* — Buris Law, PLLC

(57) ABSTRACT

A fuel package comprising a biomass fire-log bound by an adhesive consisting of a starch and a hydroxide and at least one ignition aid is provided along with a method of manufacturing the same.

15 Claims, 4 Drawing Sheets

BIOMASS FIRE-LOG AND METHOD OF MANUFACTURE

CROSS-REFERENCE TO RELATED APPLICATIONS

This application claims the benefit of the filing date under 35 U.S.C. §119(e) of U.S. Provisional Application No. 61/928,923 filed Jan. 17, 2014, the entire disclosure of which is incorporated herein by reference.

FIELD

This disclosure relates generally to engineered fuel packages or fire-logs. More specifically, this disclosure relates to wood fuel packages and charcoal fuel packages that consumers can easily ignite, as well as methods of manufacturing the same.

BACKGROUND

The statements in this section merely provide background information related to the present disclosure and may not constitute prior art Fuel packages have traditionally been available to consumers as charcoal fuel and wood fire-log fuel. These combustible fuel packages are commonly used both for home and recreational purposes. Such fuel packages have experienced great popularity in recent years and are strongly desired for a variety of purposes, especially cooking and heat-generation, for example. In addition, these fuel packages have been primarily produced from wood materials, rather than annually renewable, and environmentally preferred biomass sources.

With respect to charcoal fuel packages, petroleum lighter fluids may be used with easy-lighting charcoals, the coal dust and filler materials in charcoal briquettes, and wood fire-logs. However, these petroleum lighter fluids are harmful to the environment, can soil the consumer or his/her clothing, and are relatively dangerous to use or store due to their flammability, and not food cooking safe.

There are many brands and varieties of cooking charcoal on the market, such as briquettes, chunk charcoal, and variations that contain petroleum based lighter fluid to allow lighting without the need for other starting apparatus. There are also charcoal brands which ignite easily by utilizing a paper packaging in combination with a petroleum starter that is lit in several places causing the charcoal to ignite.

Another wood fuel used in the art is wood fire-logs. Wood fire-logs are commonly produced as compressed or all-wood fire-logs. There are many types of compressed fire-logs on the market made from sawdust, sawdust-and-wax mixtures, recycled cardboard and other similar materials.

Well-known compressed sawdust-and-wax fire-logs are commonly sold in retail stores under various trade-names such as "Duraflame" and "Pine Mountain." These compressed sawdust-and-wax fire-logs ignite easily because they are covered in paper that may be lit in several places. Once the paper covering is lit, the paper then ignites the fire-log, which itself has a low combustion threshold due to the presence of flammable petroleum wax materials that typically constitutes 50% to 60% of these fire-logs.

Many consumers avoid using petroleum wax with the sawdust-and-wax fire-log and seek more natural products made with just pure sawdust or other suitable vegetation material, including but not limited to, annually renewable biomass materials. These fire-logs are made by a fundamentally different process than the wax variety of fire-log, as the process uses extremely high pressure to cause a mechanical locking of fiber of the lignin in the wood, resulting in the bonding of the material into a solid log unit without the adhesive and binding characteristics of wax or other foreign materials. While this has the advantages of creating a solid log without binding agents, it also increases the combustion threshold of the log, making it difficult to light.

When such fire-logs are burned, it is only wood or biomass material burning and many consumers prefer the resulting fire from the standpoint of ecological concerns, odor and other esthetics, as well as the controllability of an all-wood and/or biomass fire as opposed to a fire maintained mostly by the combustion of wax. Wax-containing logs come with warnings not to poke them when burning and not to burn more than one at a time because of the problems with flaring of the wax. Wax logs have also been known to explode in fireplaces.

Often wood fire-logs may be difficult to light because of the denseness of the material, which may prohibit timely combustion. Various brands of wood fire-logs provide manufacturers' directions that involve chopping chunks off a fire-log, and using kindling to light those chunks, all in order to light the full fire-log. This process might work provided the amount of additional kindling is sufficient to ignite the chunks. However, this process often requires "standard fire-building" in situations when the manufacturer's instructions fail. "Standard fire-building" typically requires the placement of paper or other kindling and small pieces of dry wood around the full log in order to achieve ignition. Standard fire-building may also involve the use of newspaper, kindling and/or flammable fire starters that can create an unpleasant odor, especially when used indoors.

As noted above, lighting an all-wood and/or all-biomass fire-log is not easy. Existing brands of all-wood fire-logs come with multi-step instruction sheets requiring the person desiring a fire to chop up portions of the log, position the chopped portions in a specific arrangement with respect to the whole logs, and place additional kindling around or beneath the wood fire-logs. Despite following these instructions, the logs may not always light.

SUMMARY

The present disclosure provides a fuel package and method of manufacturing the fuel package that combines an ease-of-lighting ignition aid made using flammable petroleum based binding materials and accelerants, with the cleanliness and desirability of an all-natural product associated with the packaging and/or manufacturing to create a "one-match" ignition of natural combustible material. The use of the fuel package and method of the present disclosure avoids or eliminates the use of petroleum based lighter fluids as well.

The fuel package generally comprises a biomass fire-log bound by an adhesive consisting of a starch and a hydroxide and at least one ignition aid. According to one aspect of the present disclosure, the at least one ignition aid is a natural wax that is mixed with a fibrous combustible material. The fibrous combustible material may be selected from the group consisting of saw dust, planer dust, wood fibers, wood shavings, shredded cardboard, charcoal, agricultural waste, coal, and paper.

According to another aspect of the present disclosure, the at least one ignition aid is pressed directly into a depression in the fire-log. Alternatively, the at least one ignition aid is placed into a cup that is disposed within a depression in the fire-log. The adhesive may also form a substantially continuous outer shell around an exterior portion of the biomass fire-log. Optionally, the adhesive is a lignin.

The biomass fire-log may comprise a composition of combustible biomass materials that has a moisture content ranging from about 2% to about 12%. The composition of combustible biomass materials present in the biomass fire-log may range from about 90% to 95% by weight with about 5% to 10% of the weight of the fire-log being an adhesive. Alternatively, the biomass fire-log may comprise about 69% to 98% of the combustible biomass materials, about 1% to 30% of starch, and less than 1% of the hydroxide by weight. The biomass fire-log has a final moisture content that ranges from about 8% to about 20%, alternatively, the final moisture content is about 12% by weight.

In the fuel package, the starch may be formed from a starch source capable of reacting with the hydroxide, the starch source being at least one of wheat, oats, rice, corn, wheat middling, wheat waste, and wood. In addition, the hydroxide may be at least of one an alkali metal hydroxide, an alkaline earth hydroxide, sodium hydroxide, potassium hydroxide, calcium hydroxide, lithium hydroxide, and caustic soda. According to one aspect of the present disclosure, about 5% to 20% of the starch content is gelatinized.

According to another aspect of the present disclosure, the fuel package further comprises an additive selected from the group consisting of a popping additive and a colorant. The colorant may be a coating applied to the popping additive.

A method of making the fuel package described above and herein is provided without exceeding the scope of the present disclosure. This method generally comprises forming a biomass fire-log that comprises a composition of combustible biomass materials and an adhesive consisting of a starch and a hydroxide; and incorporating at least one ignition aid into the biomass fire-log to form the fuel package. The biomass fire-log as manufactured may have a moisture content from about 8% to about 20% and the starch and hydroxide are added separately such that the adhesive is activated during forming. Optionally, the method may include subjecting biomass materials of the fire-log to a biomass roaster prior to forming the fire-log.

The at least one ignition aid may be incorporated into the biomass fire-log by placement directly into a depression in the biomass fire-log. Alternatively, the at least one ignition aid may incorporated into the biomass fire-log by placement into a cup that is inserted into a depression in the biomass fire-log. The ignition aid may also incorporated into the biomass fire-log by being applied as one of a caulk, ribbon, extruded rope or rod-shaped component over a length of the biomass fire log or as an intermittent strip or bead pressed into a recess in the biomass fire-log. The at least one ignition aid may also be incorporated into the biomass fire-log by breaking the fire-log into two or more pieces in the direction of the fire-log's length or width and placing the at least one ignition aid between the two or more pieces.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1A:
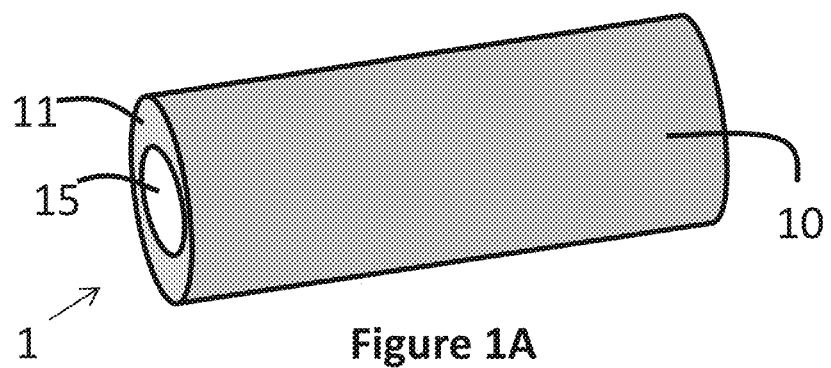
FIGS. 1A-1E are schematic representations of various ways in which a starter or ignition aid is incorporated into a fuel package or log according to the teachings of the present disclosure.
Figure 1B:
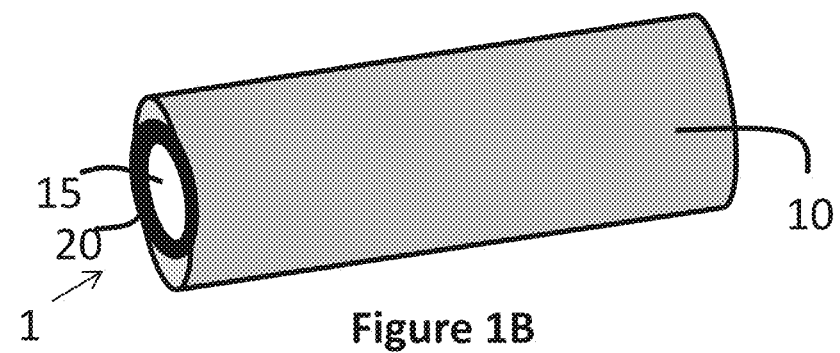
Figure 1C:
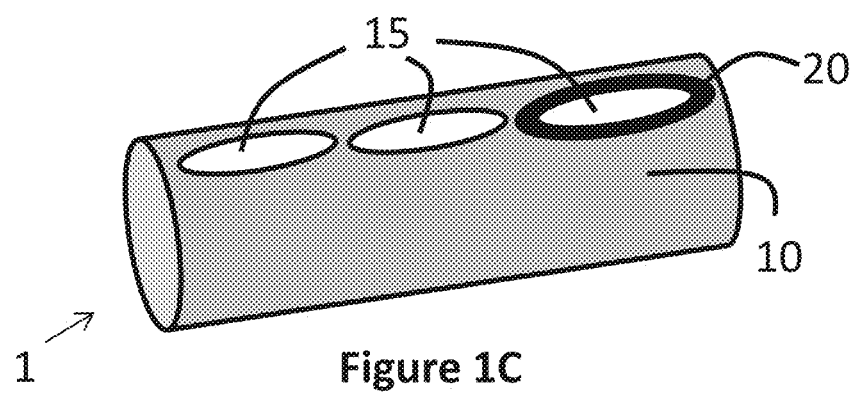
Figure 1D:
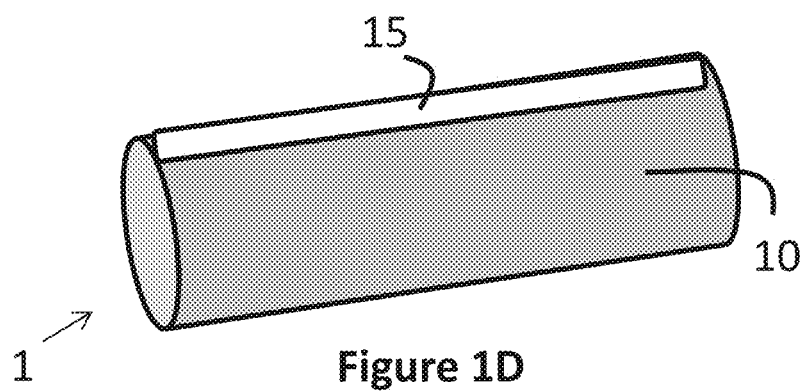
Figure 1E:
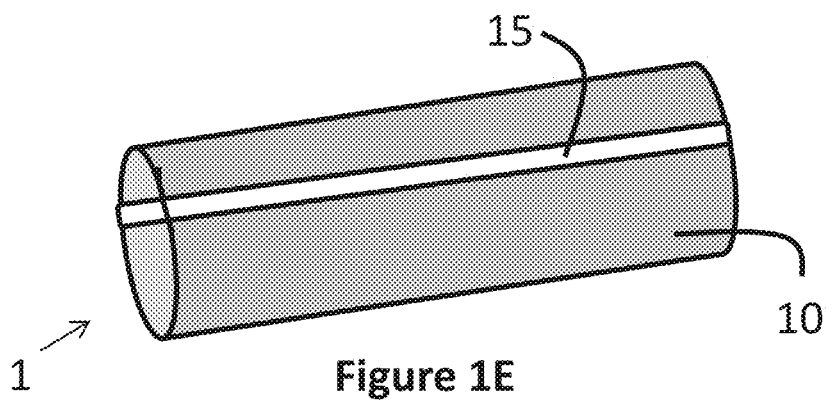

The drawings described herein are for illustration purposes only and are not intended to limit the scope of the present disclosure in any way.

DETAILED DESCRIPTION OF THE INVENTION

The following description is merely exemplary in nature and is in no way intended to limit the present disclosure or its application or uses. It should be understood that throughout the description, corresponding reference numerals indicate like or corresponding parts and features.

The present disclosure generally relates to engineered fuel packages or fire-logs and a method for ignition of the fuel package. The packaged fuels, both annually renewable biomass fuel and wood fire-log fuels, disclosed herein afford easy lighting, using clean and renewable-resource packaging materials without recourse to undesirable ingredients such as petrochemicals and processed paper, and present a more attractive appearance than usually associated with traditionally packaged wood fuels.

According to one aspect of the present disclosure, the methods and fuel packages disclosed herein provide for quick lighting of an integrated ignition aid, while avoiding undesirable materials. The disclosed methods and packages combine the ease-of-lighting of the integrated ignition aid made using flammable petroleum-based binding materials and accelerants, with the cleanliness and desirability of an all-natural product.

According to another aspect of the present disclosure, the disclosed methods and packages provide a "one-match" ignition for wood fuels like biomass and wood fire-logs; fire-logs produced according to the teachings and materials, e.g., binder, described herein. A "one-match" ignition is an ignition that requires minimal effort by the consumer. With respect to wood fire-logs, various approaches attempted to achieve "one-match" ignition have addressed the lighting of composite logs, but not wood or biomass fire-logs. The disclosed method is capable of very quickly lighting fuel logs.

The methods, apparatus, and materials, including but not limited to, the way to bind wood or non-woody biomass materials together using a specific binder composition as disclosed in co-pending U.S. Utility application Ser. No. 13/018,155, entitled 'Biomass Fuel Compact Processing Method", filed Jan. 31, 2011, is hereby incorporated in its entirety by reference. In addition, co-pending U.S. Utility application Ser. No. 13/841,824, entitled "Moisture Resistant Biomass Fuel Compact and Method of Manufacturing", filed Mar. 15, 2013, as well as co-pending U.S. Utility application Ser. No. 12/197,513, entitled "Rotary Biomass Dryer", filed Aug. 25, 2008 and U.S. Provisional Application No. 61/792,972, entitled "Rotary Biomass Gasifier/Dryer for Production of Dry Biomass, Roasted Biomass, Biochar, Carbon, and Pyroligneous Acid with Aftercooler and Condensor Means", filed Mar. 15, 2013, are hereby incorporated in their entirety by reference.

The methods described in the disclosures of which are expressly incorporated herein by reference above, are used to produce an engineered log that: 1) reduces bug or insect larvae in the log or reduces and/or eliminates microbial organism or fungal populations in the log; 2) reduces the presence of dust or is dust-free; and 3) is environmentally preferred. The reduction and/or elimination of insect larvae is accomplished by using a roaster to treat the input material with a temperature high enough to kill or significant eliminate live insects or the insect larvae. The reduction in dust is accomplished by using a binder that increases the overall durability of the log. Finally, the use of the binder also assists in overcoming the lack of lignin in the non-woody, annually renewable biomass sources, and thereby allows for the use of reusable or recyclable agricultural materials.

An advantageous step of the present disclosure involves adding a binder or adhesive to combustible biomass materials to form a biomass fire-log, wherein the adhesive comprises a starch and a hydroxide. Typically, the biomass fire-log may comprise moisture content of about 8% to about 20%, and more specifically about 12%. The combination of the combustible biomass composition and the adhesive additive, along with other additives as described below.

Generally, the biomass fire-log uses an adhesive made from starch, or any other suitable material to replace the natural lignins as set forth above. In the adhesive, about 5% to 20% of the total starch content is gelatinized into a high viscosity paste called primary starch. The remainder of the starch (about 80% to 90%) stays ungelatinized and is called secondary starch. The starch may be one produced from a starch source capable of reacting with the hydroxide, the starch source being wheat, oats, rice, corn, wheat middling, wheat waste or even wood and the like, but containing a gelatinized fraction that upon substantial drying will tightly bond the biomass composition. The starch may become gelatinized by reacting with the hydroxide and being subjected to heat during processing.

Additionally, the adhesive additive includes a hydroxide. The hydroxide may be, for example, alkali metal hydroxides, alkaline earth hydroxides, sodium hydroxide, potassium hydroxide, calcium hydroxide, lithium hydroxide, and caustic soda, among others. The synergistic combination of starch and hydroxide provide a highly durable biomass fuel compact, in which any number of constituent combustible materials may be used, without relying on any natural lignins or other undesirable binders.

In one form, the innovative adhesive is provided to bind the constituent biomass composition and also to form a substantially continuous shell around the exterior portion of the fire-log. Optionally, this adhesive may be a lignin. With this outer shell, the biomass fire-log according to the present disclosure is highly durable and significantly reduces the traditional dust issues associated with biomass compositions, as set forth above.

In one exemplary composition of the present disclosure, the biomass fire-log comprises, by percent weight, about 69-98% biomass composition, about 1-30% starch, and less than 1% hydroxide. Another composition is about 90-95% biomass and about 5-10% of the inventive adhesive additive.

According to another aspect of the present disclosure, the engineered fuel package system incorporates an easy ignition feature. Optionally, the fuel package system may also incorporate combustible materials (e.g., seeds or grains) to the increase the "popping and cracking" of the burning log to enhance consumer experience. In addition, the fuel package system may also when desirable include the addition of colorant to enhance the consumer experience, whereby the color coating is added directly, or through a coating applied to the seeds or grains described above.

The fuel package or fire-log may also comprise an external layer or packaging that can be accomplished using any means known in the art, including but not limited to the use of shrink wrap with environmentally preferred materials, chip board, biodegradable materials, or other materials. The fuel package may also include a handle for easy and convenient transporting and stacking and/or display at a retail or wholesale sales outlet.

One aspect of the fuel packages or logs disclosed herein is to keep all materials used as natural as possible, such that the benefit is to have a result that is superior with respect to the naturalness and renewable-resource characteristics of the ingredients compared to solutions requiring petroleum products such as waxes, plastics or processed papers. The fuel packages of the present disclosure use the wood or biomass fuel itself for the wood or biomass component and should not require external tinder, kindling, or similar material. In addition, the materials associated with the integrated ignition aid, may also be kept as natural as possible. For instance, naturally occurring wood kindling is not typically burned because of regulations. In addition, using natural materials lowers the cost to make a wood fuel package or log, and may be lower cost for the consumer.

The ignition aid as incorporated into the fuel packages of the present disclosure provides a complete system that allows for wood fuel ignition without requiring the consumer to undertake typical fire-building techniques. The starter or ignition aid represents a means through which the fuel log may be easily ignited.

Referring to FIGS. 1A-1E and FIG. 2A, a fuel log 1 is shown that highlights various means in which the ignition aid 15 may be incorporated into the log 10. The ignition aid 15 may be directly placed into a hole or depression made in the end 11 of the log 10 (see FIG. 1A), or in one or more depressions that are created on the side of the log 10, e.g., along the length of the log (see FIG. 1C). Multiple starters or ignition aids 15 may be incorporated into the log (see FIG. 1C). The ignition aid 15 may also be placed directly into the hole or depression in the log 10 (see FIGS. 1A & 1C) or into a small cup 20 that is inserted into the hole or depression in the log 10 (see FIGS. 1B & 1C). Alternatively, the ignition aid or starter 15 may be applied as a caulk, ribbon, extruded rope or rod-shaped component over the entire length of the log or as an intermittent strip or bead applied or pressed into a depression or "inverted rib" located on the side of the log (see FIG. 1D). The inverted rib or depression may also be a v-groove or u-groove that is formed into the log, either as the log is made or via a secondary process. Alternatively, the at least one ignition aid is incorporated into the biomass fire-log by breaking the fire-log into two or more pieces in the direction of the fire-log's length or width and placing the at least one ignition aid between the two or more pieces (see FIG. 1E). A fresh break in the fire-log can provide a rough texture that may assist in facilitating ignition.

The ignition aid material, whether used in a recessed cup, or pressed directly onto a position on the log, is made a malleable combustible material, such as natural wax, mixed or blended with fibrous combustible material, such as saw dust, planer dust, wood fibers, wood shavings, shredded cardboard, charcoal, agricultural waste, coal, and paper, or other combustible fibers. The agricultural waste may arise from the production process used to form briquettes or from other processes used to form biomass fuel compacts as referenced herein with respect to co-pending U.S. Utility application Ser. Nos. 13/018,155 and 13/841,824.

Since the ignition aid is made from the same or similar material as the main fuel or fire-log, the heat generated upon burning the ignition aid is sufficient to ignite the entire log, and provide a pleasing natural-looking fire experience without the need to manually chop, stack, arrange, and kindle some arrangement of material. The combustibility of the ignition aid, combined with its ability to be formed easily into a recess or groove integrated into the log, together with its low cost and ubiquity, and its "all-natural" content and image, allows the creation of a very effective, clean-burning, and instant method of lighting the fire-log. This same feature is likewise applicable to charcoal fuel or biomass fuel as well without exceeding the scope of the present disclosure. The ignition aid may also comprise an all-natural vegetable wax made from soybeans or an equivalent. When applied to fire-logs, the all-natural vegetable wax enhances the reliability of starting the fire, and avoids usage of petroleum-based products. While conventional fire-logs use wax and wood elements as an aid to fire-lighting, the overall combination of the elements in the present disclosure is unique in its effectiveness, cleanliness, and convenience for the consumer. The fuel packages of the present disclosure provides for improvement over charcoals that use petroleum accelerants to ignite, or other petrochemical-based ingredients in the packaging as an aid to ignition. The ignition aid may optionally include a carrier that is flexible and strong, yet lightweight, burn easily, be free of petrochemicals, and be made from renewable resources. The carrier or recessed cup or groove covering (if one is used) may be made from polymerized cornstarch, which is biodegradable, and designed for disposal by incineration. An example of this biodegradable material is "Mater-bi," a well-developed product in Europe, which is typically imported into the United States. Additional examples of the carrier may include, a porous non-paper flammable fiber covering such as corn husking, banana leaves, papyrus, duck weed, or similar material.

Figure 2A:
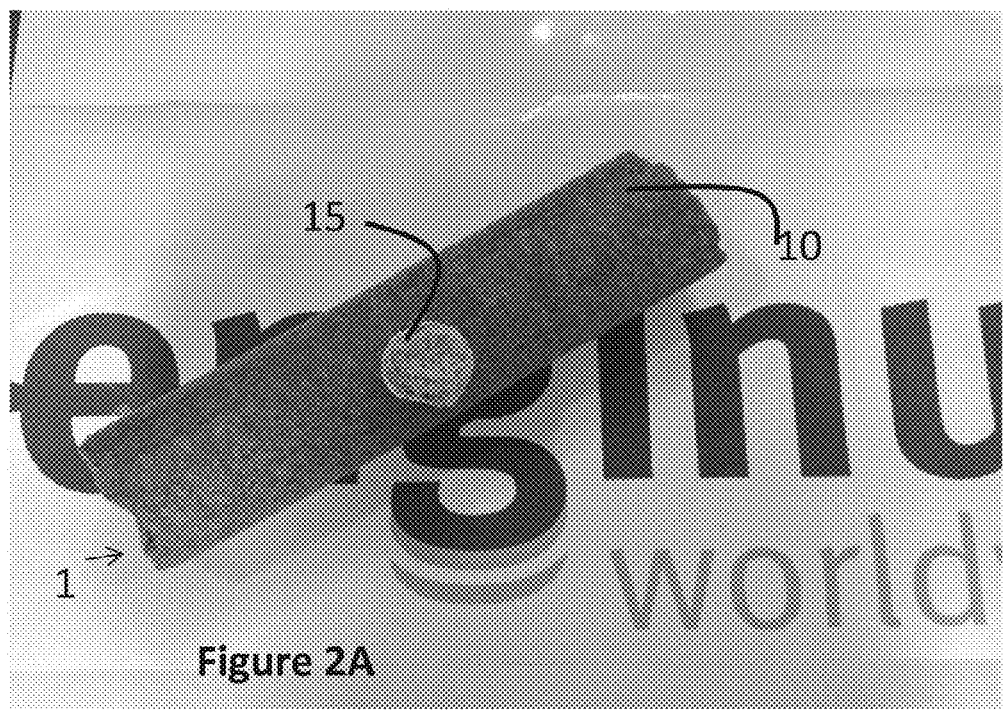
FIG. 2A is pictorial representation of a fuel package or log and an ignition aid prepared according to the teachings of the present disclosure.
Figure 2B:
FIG. 2B is a pictorial representation of a fuel package prepared according to the present disclosure being burned.

Referring now to FIG. 2B, when lit, the fuel packages 1 enable the ignition aid to ignite and burn without an external apparatus, recourse to undesirable materials and without any external kindling or skill on the part of the consumer. Optionally, in some applications directed to both charcoal and wood fire-logs, the fire-logs may incorporate when desirable a small amount of vegetable wax accelerant, like soy wax, to the fire-log chip or bee's wax and wafer starter material, or to charcoal chips and chunks starter materials.

The ignition aid may be manufactured through batch or continuous processed, and formed into a multitude of shapes that then can be integrated into the fire-log into a variety of ways including but not limited to: a cup in a recessed hole either on an end or on the axial line, or in multiple positions; a ribbon or rope pressed into a u or v-groove, in continuous or local placement; attached to the end of the fire-log, coated on the end through immersion, or extruded locally or over the outer diameter (OD) of the fire-log.

Figure 3:
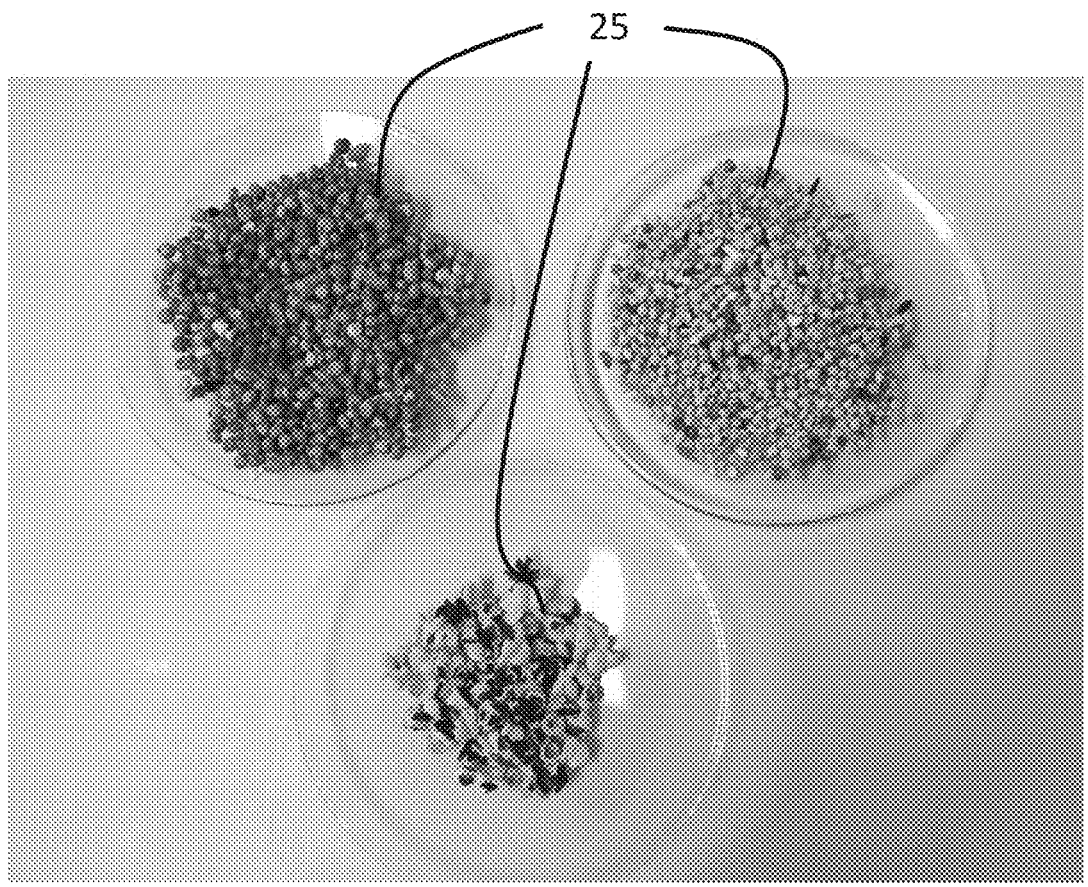
FIG. 3 is a pictorial representation of a popping additive optionally incorporated into the fire-log of the present disclosure.

Referring now to FIG. 3, seeds of low cost grain, including but not limited to milo, maize, millet, barley, wheat, oats, etc., or spice seeds may be included in the fire-log incoming fuel formulation as a popping additive 25. The moisture of the popping additive 25 is higher performing at an optimized moisture content, as described by HORTSCIENCE 44(1): 135-137 (2009) entitled "Effects of Seed Moisture Content, Cooking Time, and Chamber Temperature on Nun's Bean (*Phaseolus vulgaris* L.) Popping" by Jesse Vorwald and James Nienhuis (University of Wisconsin—Madison, Department of Horticulture, 1575 Linden Drive, Madison, Wis. 53706-1590), which is hereby incorporated in its entirety by reference.

The incorporated seeds as a popping additive during the combustion of the log to give off a loud sound, or report. Any seed may be incorporated, but Milo seed is preferred because the seed of milo expands 9X the expansion of other seeds, and therefore yield a larger sound or report of "POP" as described in http://en.wikipedia.org/widi/popcorn, the entire contents of which are incorporated herein by reference. The incorporation of seeds into the log would not be possible without the binder technology which allows for any mixture of combustible, and natural, materials to be incorporated into fuel compacts or logs.

According to another aspect of the present disclosure, chemicals can be added to the fire packages to enhance or increase the color of the flame during combustion. These chemicals or colorants may include, but not be limited to those shown in Table 1. Alternatively, the colorants may be chosen to be coated on the exterior of the seed to get an integrated color and sound experience during burning the log.

The construction of the fire-log or fuel packages may include, a portion or all of the incoming wood or biomass material being processed using a biomass roaster. The roaster can achieve temperatures that will kill or significantly reduce the live insects or eggs, microbial organisms, or fungus, that is included in the incoming biomass, and therefore reduce the bug population that is on or in the fire-log.

According to one aspect of the present disclosure a method of making a fuel package is provided. The method generally comprises forming a biomass fire-log that comprises a composition of combustible biomass materials having moisture content from about 8% to about 20% and an adhesive consisting of a starch and a hydroxide; and incorporating at least one ignition aid into the biomass fire-log to form the fuel package. In one method, the starch and the hydroxide are separate and are combined during forming to activate the adhesive binder.

TABLE 1

| Colorants | |
|---|---|
| COLOR | CHEMICAL |
| Carmine | Lithium Chloride |
| Red | Strontium Chloride or Strontium Nitride |
| Orange | Calcium Chloride (a bleaching powder) |
| Yellow | Sodium Chloride (table salt) or Sodium Carbonate |
| Yellowish Green | Borax |
| Green | Copper Sulfate or Boric Acid |
| Blue | Copper Chloride |
| Violet | 3 parts Potassium Sulfate-1 part Potassium Nitrate (salt peter) |
| Purple | Potassium Chloride |
| White | Magnesium Sulfate (Epsom salts) |

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fuel package comprising a biomass fire-log bound by an adhesive consisting of a starch and a hydroxide and at least one ignition aid, wherein the at least one ignition aid is either pressed directly into a depression in the fire-log or is placed into a cup that is disposed within the depression in the fire-log.

2. The fuel package according to claim 1, wherein the at least one ignition aid is a natural wax that is mixed with a fibrous combustible material.

3. The fuel package according to claim 2, wherein the fibrous combustible material is selected from the group consisting of saw dust, planer dust, wood fibers, wood shavings, shredded cardboard, charcoal, agricultural waste, coal, and paper.

4. A fuel package comprising a biomass fire-log bound by an adhesive consisting of a starch and a hydroxide and at least one ignition aid, wherein the fire-log is broken into two or more pieces in the direction of the fire-log's length or width and the at least one ignition aid is placed between the two or more pieces.

5. The fuel package according to claim 1, wherein the biomass fire-log comprises a composition of combustible biomass materials; the biomass fire-log having a moisture content from about 8% to about 20%.

6. The fuel package according to claim 1, wherein about 5% to 20% of the starch content is gelatinized.

7. The fuel package according to claim 6, wherein the starch is formed from a starch source capable of reacting with the hydroxide, the starch source being at least one of wheat, oats, rice, corn, wheat middling, wheat waste, and wood.

8. The fuel package according to claim 6, wherein the hydroxide is at least one of an alkali metal hydroxide, an alkaline earth hydroxide, sodium hydroxide, potassium hydroxide, calcium hydroxide, lithium hydroxide, and caustic soda.

9. The fuel package according to claim 1, wherein the adhesive forms a substantially continuous outer shell around an exterior portion of the biomass fire-log.

10. The fuel package according to claim 9, wherein the adhesive is lignin.

11. The fuel package according to claim 1, wherein the biomass fire-log comprises about 90% to 95% of the combustible biomass materials and about 5% to 10% of the adhesive by weight.

12. The fuel package according to claim 1, wherein the biomass fire-log comprises about 69% to 98% of the combustible biomass materials, about 1% to 30% of the starch, and less than 1% of the hydroxide by weight.

13. The fuel package according to claim 5, wherein the moisture content of the biomass fire-log is about 12% by weight.

14. A fuel package comprising a biomass fire-log bound by an adhesive consisting of a starch and a hydroxide and at least one ignition aid, wherein the fuel package further comprises an additive selected from the group consisting of a popping additive and a colorant.

15. The fuel package according to claim 14, wherein the colorant is a coating applied to the popping additive.

* * * * *